Sept. 28, 1943. H. C. BRIGGS 2,330,674
MECHANISM FOR IMPROVING THE DIRIGIBILITY
OF SHIPS, SUBMARINES, AND AIRCRAFT
Filed Oct. 19, 1939 4 Sheets-Sheet 2
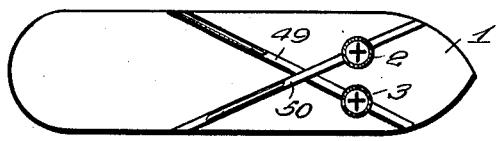
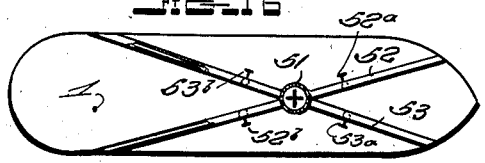
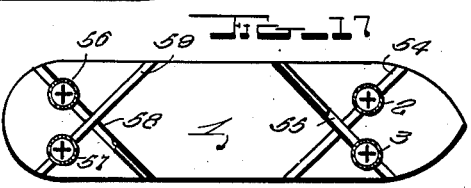
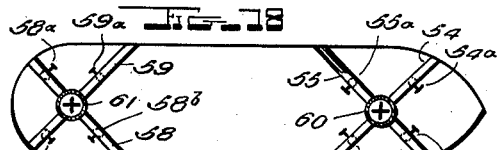
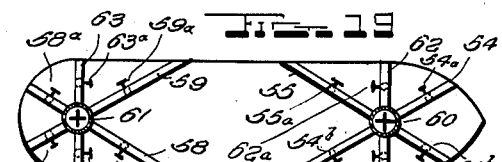
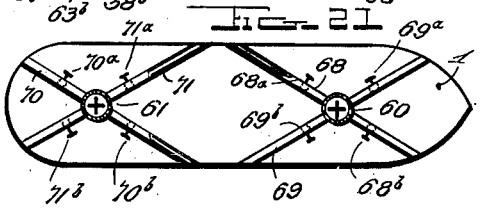
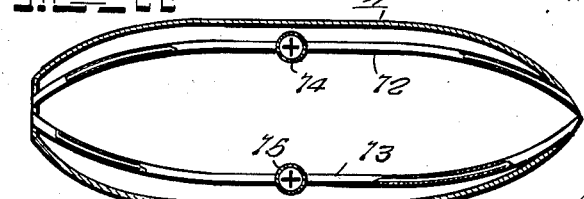
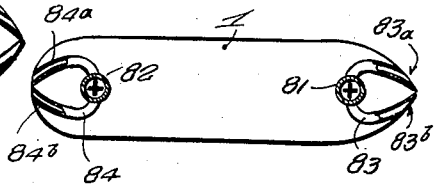
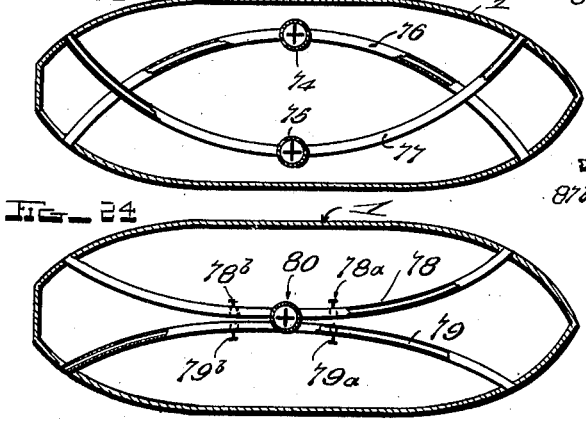
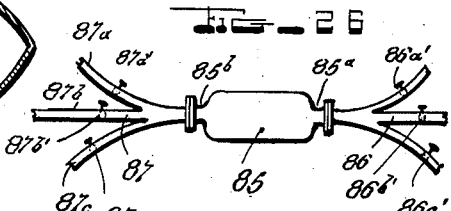
INVENTOR.
Henry C. Briggs,
BY John B. Brady
ATTORNEY.

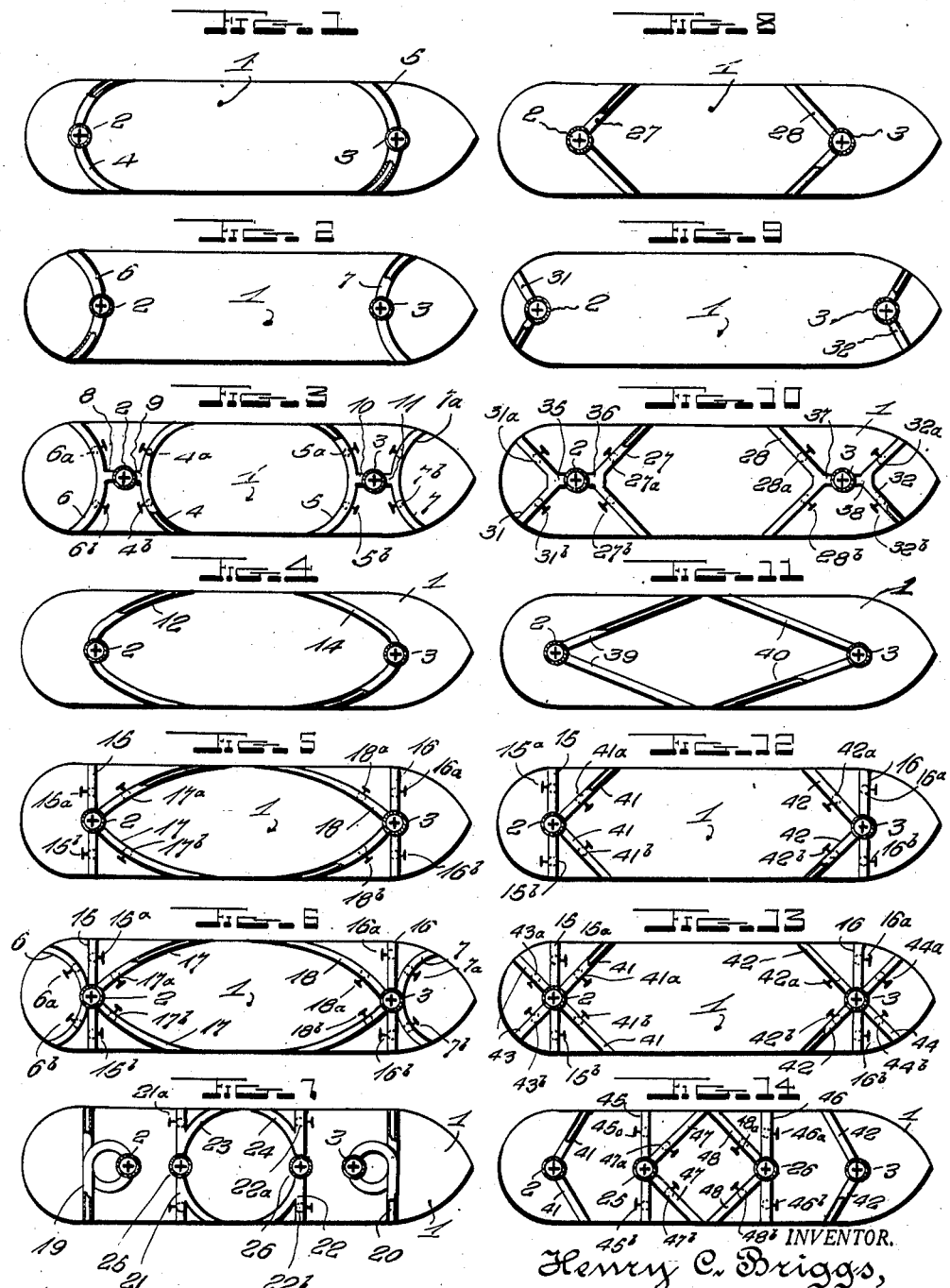

Sept. 28, 1943.     H. C. BRIGGS     2,330,674
MECHANISM FOR IMPROVING THE DIRIGIBILITY
OF SHIPS, SUBMARINES, AND AIRCRAFT
Filed Oct. 19, 1939     4 Sheets-Sheet 3
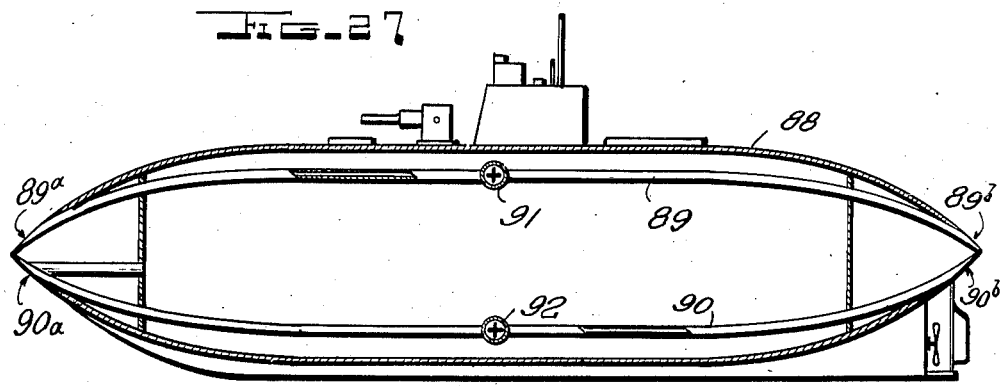
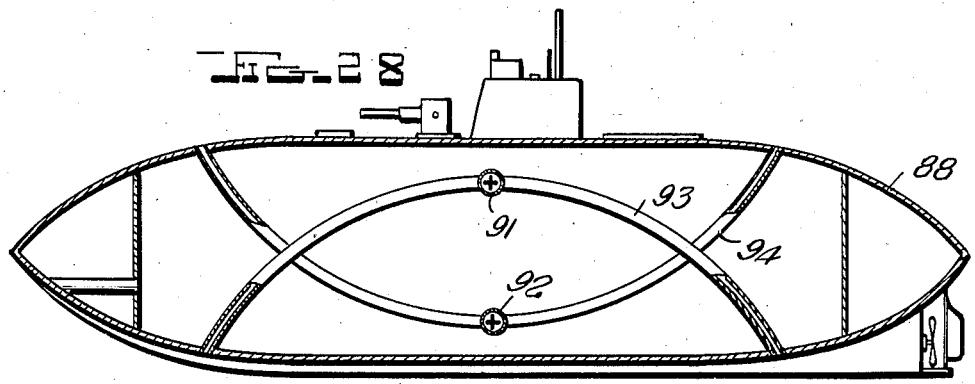
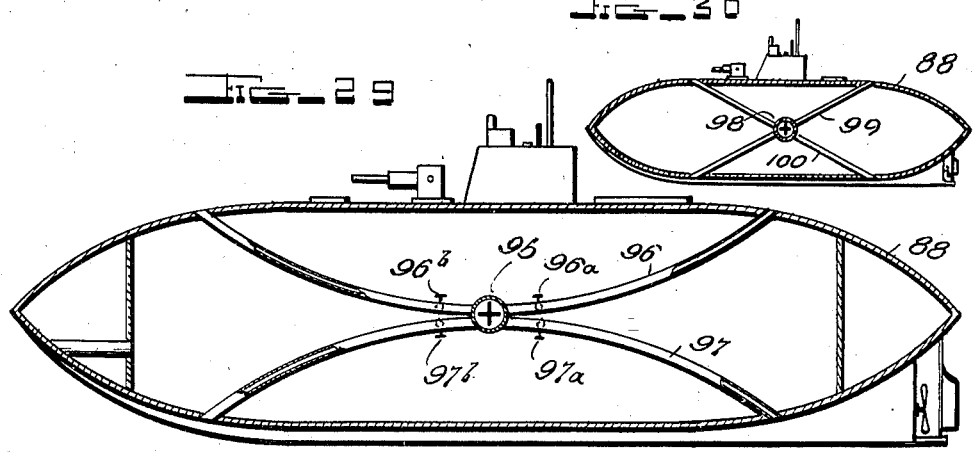
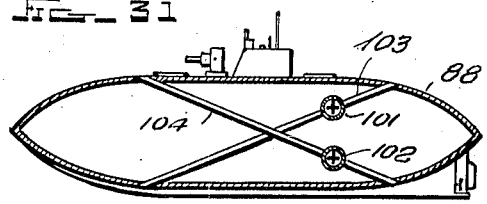
INVENTOR.
Henry C. Briggs,
BY John B. Grady
ATTORNEY.

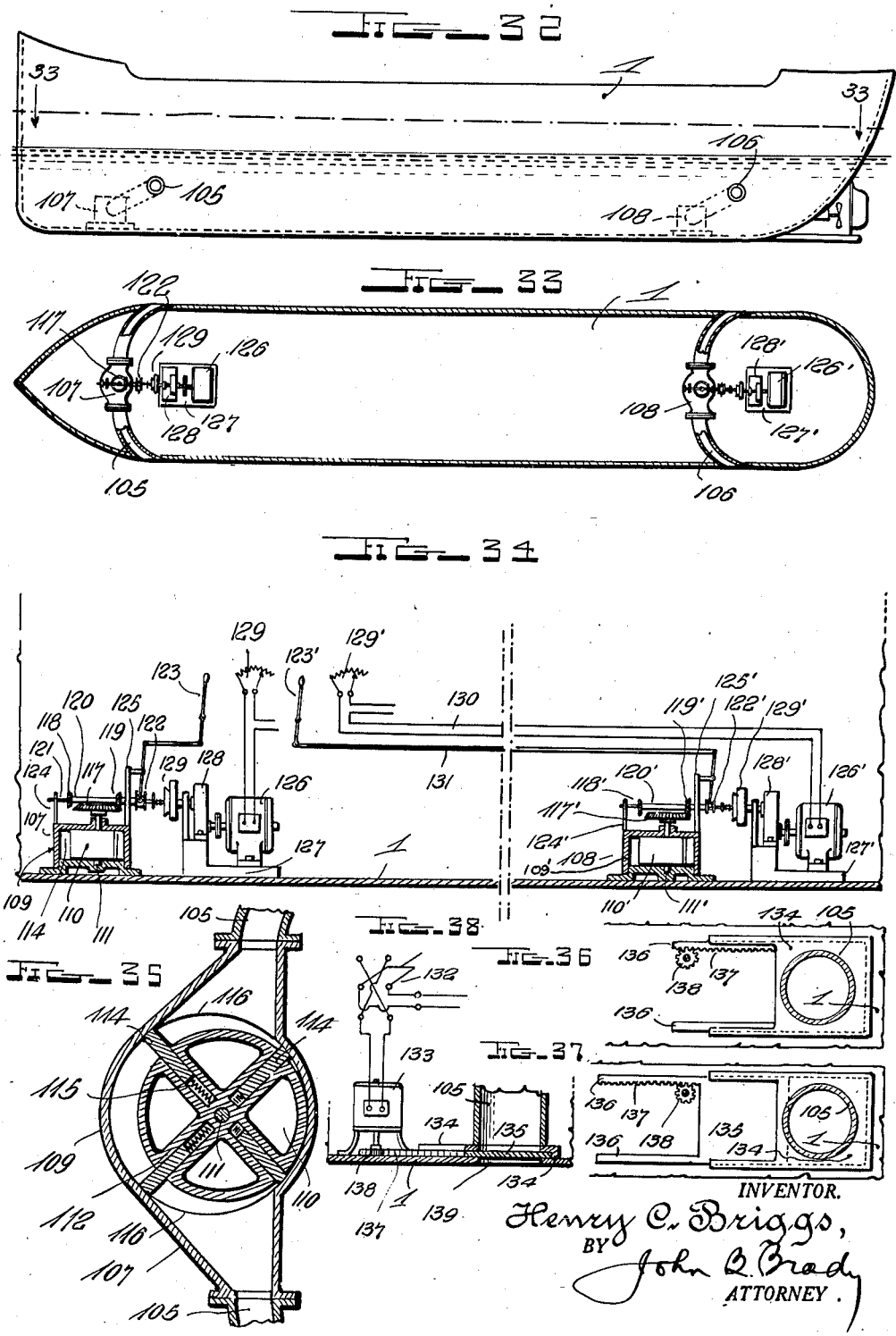

Patented Sept. 28, 1943

2,330,674

UNITED STATES PATENT OFFICE 2,330,674

MECHANISM FOR IMPROVING THE DIRIGIBILITY OF SHIPS, SUBMARINES, AND AIRCRAFT

Henry C. Briggs, Brooklyn, N. Y.

Application October 19, 1939, Serial No. 300,250

10 Claims. (Cl. 114—151)

My invention relates broadly to ships and vessels and more particularly to an improved method and apparatus for maneuvering and navigating ships and vessels.

This application is a continuation-in-part of my application Serial Number 105,112, filed October 10, 1936, for "Safety mechanism for improving the dirigibility of ships, submarines and aircraft," now Patent No. 2,178,555, issued November 7, 1939.

One of the objects of my invention is to provide a method and apparatus ancillary to existing methods of propulsion for ships and vessels for increasing the maneuverability of the ship or vessel.

Another object of my invention is to provide a system ancillary to the main propulsion system of a ship or vessel which increases the precision with which the ship or vessel responds to the helm, thereby enabling large ships to be maneuvered within minimum areas of water such as encountered in the docking of ships.

Still another object of my invention is to provide a system of maneuvering vessels in which a plurality of ducts extend through the vessel in directions adapted for the developing of controllable and reversible forces useful in precisely governing the path of movement of the vessel.

A further object of my invention is to provide an improved system for maneuvering ships in which conduits extend from pumps within the ship to intake and discharge positions in the hull of the ship and in which the speed and direction of the pumps are controllable from the navigating position on the ship for accurately maneuvering the ship under control of forces developed by the pumping of water in either direction through the conduits.

A still further object of my invention is to provide a system for navigating vessels in which pumping machinery is disposed in the hold of the vessel and connected through curved conduits to selected intake and discharge positions in the sides of the hull and substantially above the position of the pumping machinery within the vessel whereby the mass of the pumping machinery tends to lower the center of gravity of the vessel.

Another object of my invention is to provide a system of curved conduits for installation in vessels by which the sea water may be directed in confined paths downwardly from positions of intake to pumping machinery in the lowermost portion of the hold of the vessel and discharged in a confined path upwardly therefrom through the hull of the vessel and wherein the speed and direction of movement of the pumping machinery is readily controllable from the navigating position of the vessel.

Still another object of my invention is to provide a system of fluid conveying ducts extending through a vessel and through a reversible pump wherein the fluid conveying ducts are directed in such manner as to deliver controlled maneuvering forces adjacent the sides of the hull for facilitating the navigation of the vessel.

A further object of my invention is to provide an arrangement of ducts extending through the hull of a vessel wherein the ducts terminate in a duct common to all of the ducts and lead to a reversible pump controllable for pumping sea water in either direction through the ducts.

A still further object of my invention is to provide a system of ducts forming passages for pumping sea water in a confined path through the hull of a vessel wherein the pumping machinery may be arranged out of direct alignment with the path through the ducts but effectively connected therewith for pumping sea water through the ducts in either direction.

Another object of my invention is to provide a system of curved ducts for pumping water in a confined path through the hull of a vessel in which the pumping machinery may be arranged out of transverse alignment with the intake and discharge ends of the curved ducts and controlled to impart by the pumping of the sea water, maneuvering forces to the vessel.

Other and further objects of my invention reside in the arrangement of curved ducts extending through the hull of a vessel with series connected reversible pumping means and controlled valves arranged in the ducts for developing by a pumping operation through the ducts, navigating and maneuvering forces for the vessel as set forth more fully in the specification hereinafter following by reference to the accompanying drawings, in which:

Figure 1 is a plan view showing a vessel having the maneuvering system of my invention installed thereon employing curved conduits formed on axes having their centers on opposite sides of the amidship section of the vessel; Fig. 2 shows a modified arrangement of curved conduits which are formed on centers adjacent the bow and stern of the vessel; Fig. 3 illustrates a vessel having a composite arrangement of the conduits illustrated in Figs. 1 and 2 with a common connection between the conduits adjacent each end of the vessel; Fig. 4 shows the application of my invention to a vessel wherein curved conduits are employed having pumping means adjacent opposite ends of the vessel and intake and discharge apertures in spaced positions on opposite sides of the amidship section of the vessel; Fig. 5 shows a modified arrangement of a conduit system for a vessel in which curved conduits extend from pumping machinery located adjacent opposite ends of the vessel to intake and discharge ports on opposite sides of the amidship section of the vessel in combination with transversely extending conduits; Fig. 6 shows a modified arrangement of conduit system which combines the advantages of the conduit arrangements illustrated in Figs. 2 and 5; Fig. 7 illustrates a system of curved conduits in which transverse conduits and conduits curved on centers on opposite sides of the amidship section of the vessel are combined and wherein separate conduits are located adjacent opposite ends of the vessel and looped to reach the position of the pumping means; Fig. 8 illustrates a further modified arrangement of conduits in which separate bent conduits extend from pumping means adjacent the bow and stern of the vessel and project through the vessel toward the amidship section thereof and terminate at opposite sides of the hull of the vessel; Fig. 9 illustrates an arrangement similar to that shown in Fig. 8 except that the bent conduits extend to opposite sides of the bow and stern of the vessel from the pumping machinery; Fig. 10 shows an arrangement of conduits which combines the advantages obtained by the arrangement of conduits illustrated in Figs. 8 and 9 and in which the common conduits leading from the pumping machinery connect to the conduits which extend in opposite directions through the sides of the hull; Fig. 11 shows an arrangement of conduits in which the pumping machinery is located adjacent the bow and stern of the vessel but in which the intake and discharge ports terminate at the sides of the hull adjacent the amidship section of the vessel; Fig. 12 shows an arrangement of ducts in which transversely extending conduits have the pumping machinery disposed in series therewith adjacent the bow and stern of the vessel and in which additional conduits extend from the pumping machinery through opposite sides of the hull in positions fore and aft of the amidship section of the vessel; Fig. 13 shows an arrangement of conduits similar to that illustrated in Fig. 12 except that the angularly arranged conduits are extended to positions on opposite sides of the bow and stern of the vessel; Fig. 14 shows a modified arrangement of duct system wherein four pumping systems are provided with angularly extending conduits projecting from pumping systems located adjacent the bow and stern through the opposite sides of the hull in positions remote from the amidship section of the vessel combined with ducts substantially in the arrangement shown in Fig. 12 but located adjacent the amidship section of the vessel; Fig. 15 shows an arrangement of vessel in which the pumping machinery is arranged adjacent the bow of the vessel and the conduits extended diagonally in opposite directions through the vessel; Fig. 16 illustrates an arrangement of conduits in which a single reversible pump is employed in association with conduits which are diagonally disposed and extend through the hull in opposite directions; Fig. 17 illustrates an arrangement of reversible pumps individual to each of four conduits extending in diagonal directions through the hull and terminating on the starboard and port sides thereof; Fig. 18 shows an arrangement of pairs of conduits disposed at substantially 90° with respect to each other adjacent the bow and stern and extending through opposite sides of the hull of the vessel and operating under control of pumping machinery common to each pair of conduits; Fig. 19 illustrates an arrangement of conduits for obtaining a greater distribution of maneuvering forces at the sides of the hull of the vessel in which three aligned conduits pass through the hull of the vessel adjacent the bow and stern and provide confined paths for the forcing of fluid through the vessel by pumping machinery common to each set of conduits; Fig 20 illustrates an arrangement of conduits in which diagonally disposed conduits are spaced substantially 30° from each other with respect to a transverse axis through the vessel and pumping machinery interposed at the juncture of the conduits for controlling maneuvering forces at opposite sides of the vessel; Fig. 21 shows the manner of shifting the angular disposition of the diagonally extending conduits for distributing the maneuvering forces adjacent the bow and stern and adjacent the amidship section of the vessel; Fig. 22 illustrates an arrangement of conduits within the vessel for facilitating the forward and rearward drive of the vessel in which the conduits extend in curved paths substantially in a longitudinal direction through the hold of the vessel and serve to overcome head resistance at the bow and drag at the stern; Fig. 23 shows an arrangement of arcuate shaped conduits for vessels in which the pumping machinery is located adjacent the port and starboard amidship section, the arrangement of conduits being such that the vessel may be readily maneuvered, propelled or changed in direction of movement; Fig. 24 shows a further modified arrangement of conduits in which a single reversible pump may be employed for effectively maneuvering a vessel by forces delivered through arcuate shaped conduits arranged along substantially convex axes with respect to the beam of the vessel; Fig. 25 illustrates another modified arrangement of conduits by which maneuvering forces may be concentrated adjacent the bow and stern of the vessel by an arrangement of conduits passing through the pumping machinery adjacent the bow and stern and substantially bent upon themselves to provide immediately adjacent intake and discharge pressure ports; Fig. 26 illustrates schematically an arrangement of reciprocative reversible pump with manifolds at opposite ends thereof to which multiple conduits are connected for distributing the maneuvering forces in the several embodiments of my invention; Fig. 27 illustrates the application of my invention to a submarine in which conduits with pumping machinery interposed in series therewith adjacent the amidship section of the submarine extend longitudinally of the vessel and terminate adjacent the bow and stern for delivering pressure effects at opposite ends of the vessel; Fig. 28 shows the application of the system of my invention to a submarine in which arcuate shaped conduits terminate above and beneath the vessel with pumping machinery disposed in series with the conduits for developing forces serving to facilitate submerging and emerging of the boat; Fig. 29 shows an arrangement of arcuate shaped conduits extending in substantially vertical paths through the submarine and operating under control of centrally disposed pumping machinery common to both conduits for facilitating submerging and emerging of the submarine; Fig. 30 shows the application of the conduit system of my invention to a submarine in which diagonally extending conduits terminate above and below the hull of the submarine from the same pumping machinery by which submerging and emerging of the submarine may be facilitated; Fig. 31 shows the application of the conduit system to a submarine where diagonally extending ducts pass vertically through the submarine with independently disposed pumping systems arranged in series with the ducts; Fig. 32 is a vertical elevation of a vessel equipped with the maneuvering system of my invention and illustrating the manner in which the curved conduits extend from the pumping machinery in the hold of vessel to intake and discharge ports in the sides of the hull at distances substantially above the center of gravity of the mass of the pumping machinery; Fig. 33 is a horizontal sectional view taken substantially on line 33—33 of Fig. 32 and showing the pumping machinery installed in the vessel in positions below the intake and discharge ports at the sides of the vessel and illustrating the drive mechanism for the pumping machinery; Fig. 34 is a schematic view showing the manner of controlling the pumping machinery from the pilot's position on the vessel and diagrammatically showing the speed control means for the driving motors and schematically showing the reversing means for controlling the direction of fluid flow through each of the conduit systems; Fig. 35 is an enlarged fragmentary sectional view taken through one form of reversible pumping system which may be employed for quickly controlling the flow of fluid in either direction through the conduits extending through the hull of the vessel; Fig. 36 shows one arrangement I may provide for closing the pressure ports in the hull of the vessel at each end of the conduits, the view showing the valve in closed position; Fig. 37 is a view similar to Fig. 36 showing the valve in open position; and Fig. 38 is a top plan view of the motor control means for the valve illustrated in Figs. 36 and 37 and showing schematically the electrical circuit and the circuit controller therefor which is located at the pilot's position to enable the navigator to quickly open or close the required valves.

My invention is directed to a system for controlling the navigation of vessels for increasing the precision of the response of large vessels to the helm and facilitating the warping of such vessels into port. I provide conduits arranged through the vessel and connected with pumping machinery so disposed in the hold that the center of gravity of the conduits and the pumping machinery is in close proximity to the lowermost portion of the beam of the ship for stabilizating the ship against the lateral thrust of forces developed through the conduits by the pumping machinery. The pumping machinery employed in the system of my invention is controllable both in direction of movement and speed from a control position on the vessel so that thrust forces may be developed and quickly controlled by the movement of sea water through the conduits. I arrange the conduits through the hull of the vessel in such manner that navigating forces of maximum effectiveness are developed which are controllable to a high degree of precision from a control position on shipboard. The conduits extend from the pumping machinery to intake and discharge positions in the sides of the hull which will develop the most effective forces for maneuvering the vessel. In distributing the conduits with respect to the pumping machinery in the hold of the vessel in positions which will provide maximum stability for the vessel even under conditions where side thrusts are developed, particular care must be taken with respect to the symmetry of the arrangement of the pumping mechanism and with respect to the center of gravity of the pumping means and associated conduits. Unless special precautions are taken concerning the placement of the pumping machinery there is danger of capsizing of the vessel by reason of the lateral side thrusts imparted to the vessel through the forces developed by the pumping machinery effective through the conduits. Recognizing the advantages of the system of conduits through the vessel as means for facilitating navigation while appreciating the dangerous problems introduced by forces developed through such conduits, I have devised systems of conduits which are curved and shaped in such manner that the points at which thrust forces are developed in the sides of the hull may be substantially above the pumping machinery so that the added mass of the conduits and the pumping machinery is employed to advantage for effectively stabilizing the vessel against the effects of the thrust forces. The pumping machinery is reversible under quick control of the pilot so that maneuvering forces may be developed at the stern, bow or amidship sections of the vessel independently of the main propulsion system of the ship. The conduit system may also be used for effectively increasing the propulsion forces either forward or backward in the case of vessels or in the case of submarines in facilitating the emerging and submerging of the submarine. My arcuate conduits and other constructions of conduits are equally valuable in the maneuvering of aircraft. When the conduits are not in operation, I may employ suitable means to complete the streamlining of the vessel external to the terminal points of the conduits, if desired.

Referring to the drawings in detail, reference character 1 designates the outline of the hull of the vessel showing pumping machinery installed adjacent the stern at 2 and adjacent the bow at 3. The pumping machinery is disposed in series in conduits 4 and 5 which are curved on centers lying between the conduits and the amidship section of the vessel. The conduits 4 and 5 are thus curved along axes which are concave with respect to each other. Sea water is pumped through the conduits 4 and 5 by pumping machinery 2 and 3, respectively, in either direction as required to develop thrust forces at either side of the vessel. In aircraft installations employing air turbine pumps, air may be pumped through such conduits. Similarly in all other instances where the system of my invention has been described and illustrated in connection with vessels, my invention is applicable to aircraft by employing air pumps in lieu of water pumps. The ports in the opposite ends of conduits 4 and 5 thus may be made either intake or discharge ports for developing the required maneuvering forces. The curvature imparted to the conduits enables a pressure head to be built up by a confined column of fluid substantially longer than is obtained by merely extending conduits transversely of the beam of the vessel and enables the pumping machinery to be located in positions within the hold of the vessel which serves to stabilize the vessel while permitting the thrust forces to be developed at the most effective positions adjacent the hull. The ballasting of the vessel by reason of the added mass of the conduits and the pumping machinery is highly important and the conduits may be so curved that the center of gravity of the added mass constituted by the conduits and pumping machinery is in the lowermost portion of the hull.

In Fig. 2 I have shown conduits 6 and 7 passing through pumping machinery 2 and 3 and curved eccentrically with respect to each other. Thrust forces are thus obtained closer to the bow and closer to the stern in the arrangement of Fig. 2 than in the arrangement of Fig. 1 which in some instances facilitates maneuverability of the vessel.

In Fig. 3 I have illustrated a composite arrangement of conduits by which the advantages of the thrust forces developed in the arrangements of both Figs. 1 and 2 is obtained. The pumping machinery 2 and 3 in the arrangement illustrated in Fig. 3 is provided with manifolds which I have indicated at 8, 9 and at 10 and 11, respectively. These manifolds serve as connecting means between the pumping machinery and the curved conduits. For example, the conduits 6 and 7, equivalent to the corresponding number of conduits in Fig. 2 connect through manifolds 8 and 11 with pumping machinery 2 and 3. Manifolds 9 and 10 serve as connections between conduits 4 and 5, equivalent to the corresponding number of conduits in Fig. 1 with the pumping machinery 2 and 3, respectively. To facilitate maneuverability of the vessel, valves which are remotely controlled from the piloting position on the vessel serve to control the effectiveness of selected conduits. I have indicated the valves schematically in each of the conduits shown in Fig. 3. That is, the conduit 6 is provided with control valves 6a and 6b; conduit 4 is provided with control valves 4a and 4b; conduit 5 is provided with control valves 5a and 5b; and conduit 7 contains control valves 7a and 7b. By opening or closing selected valves, selected conduits are rendered effective to develop thrust forces for maneuvering the vessel in desired positions.

In Fig. 4 I have shown an arrangement whereby thrust forces may be developed in close proximity to the amidship section of the vessel, although the pumping machinery 2 and 3 remains in symmetrical locations adjacent the stern and bow of the vessel. I have illustrated conduits 12 and 14 passing through the pumping machinery 2 and 3 and curved toward each other and passing through the hull of the vessel adjacent opposite sides of the amidship section of the vessel where thrust forces may be delivered through the conduits functioning either as intake or discharge units. In Fig. 5 I have shown an arrangement of conduits in which a resolution of forces may be obtained by combining the pressure effects obtained through the operation of the pumping machinery 2 and 3 through either transverse conduits 15 and 16 or curved conduits 17 and 18 or the combination thereof. The combination of effective forces is obtained by the control of the position of the sets of valves 15a and 15b in conduit 15, or 17a or 17b in conduit 17, or 16a or 16b in conduit 16, or 18a or 18b in conduit 18. These valves may be independently and remotely controlled for rendering the conduits selectively effective in developing the required thrust forces.

In Fig. 6 I have shown a composite arrangement of conduits by which the advantageous results produced both by the arrangement illustrated in Fig. 2 and the arrangement illustrated in Fig. 5 may be utilized. I have shown the transverse conduits 15 and 16 extending serially through the pumping machinery 2 and 3 with the conduits 17 and 18 connected therewith as explained in connection with Fig. 5 in combination with conduits 6 and 7 illustrated in Fig. 2. Control valves 6a and 6b are located in conduit 6 and control valves 7a and 7b are located in conduit 7. The control valves as previously described in connection with Fig. 5 are arranged in the other conduits. I have shown the conduits 6 and 7 displaced toward the bow and the stern to a greater degree than the arrangement illustrated in Fig. 2 for developing thrust forces closer to the bow and stern in coaction with the thrust forces developed transversely of the beam of the ship adjacent the ends thereof through conduits 15 and 16 and amidships through conduits 17 and 18. The intake and discharge ports for conduits 17 and 18 develop pressures amidships but because of the curvature of the conduits, establish driving forces substantially longitudinally of the vessel. Pressures exerted through the valved portion 7a of conduit 7 and the valved portion 18b of conduit 18 and through the valved portion 17a of conduit 17 and the valved portion 6b of conduit 6 tend to shift the vessel diagonally toward the beam with the pumping machinery 2 and 3 as schematically illustrated driving toward the right. Conduits 18 and 6 driving in the same direction would not assist the vessel in moving in a large circle unless conduit 6 is curved around to the stern or near the stern. In the arrangement shown in Fig. 5 circular movement of the vessel could be obtained by operation of conduits 17 and 18 with the pumping machinery 2 and 3 driving in opposite directions; or conduits 16, 18, 17 and 15 could be utilized with the pumps 2 and 3 driving in opposite directions. The placement of the pumping machinery is of prime importance in the proper balancing of the vessel under conditions of the additional thrust forces which are incident upon the hull of the vessel.

In Fig. 7 I have shown the manner in which conduits may be looped to connect with the pumping machinery and deliver the required thrust forces. Conduits 19 and 20 are looped upon themselves and pass through the pumping machinery indicated at 2 and 3. In order to symmetrically locate the pumping machinery 2 and 3 in the vessel, the loops through the conduits are directed toward each other. Adjacent the amidship section of the vessel, I provide transverse conduits 21 and 22 which merge with arcuate shaped conduits 23 and 24 which terminate at closely adjacent points on opposite sides of the amidship section. Additional pumping machinery is provided at 25 and 26 into which the conduits 21 and 23 and the conduits 22 and 24 merge. The effectiveness of the transverse conduits 21 and 22 is controlled by valves 21a and 21b and 22a and 22b respectively. The curved or circular conduits 19 and 20 have been shown for illustrative purposes as being constituted by relatively small loops but it will be understood that the pumps may be located near the amidship section of the vessel, and relatively large loops employed to carry the terminal points of the conduits over to the opposite sides of the vessel very near the bow and stern. This is a decided advantage on a light swift vessel, since the heavy pumps may be located centrally while the point of thrust is effective at the most favorable points near bow and stern. The circular or looped form of conduits cause comparatively little frictional resistance (i. e. when they are made circular). The circles may be formed in a diagonal plane. Moreover, where the conduits cannot be formed in complete circles or loops, they may be shaped otherwise to remove the pumps from the terminal positions of the conduits.

In lieu of the curved conduits there are ship installations in which preformed bent conduits having straight sections are advantageously utilized.

In Fig. 8 I have shown conduits 27 and 28 having portions extending at right angles to each other and coupled with the pumping machinery 2 and 3, respectively. Components of driving forces are thus developed at opposite sides of the vessel remote from the amidship section thereof while maintaining the maximum mass of the pumping machinery adjacent the bow and stern of the vessel. The thrust force developed by the conduit terminating on the port side of the vessel tends to drive the vessel toward the starboard while the vacuum established at the opposite end of the same conduit tends to draw the vessel toward the starboard. In coaction with the forces developed by one bent conduit, forces developed by the complementary bent conduit may drive the vessel in the opposite direction, tending to draw the stern around toward the port. There is a tendency for the pressure in one bent conduit to tend to drive the vessel forward while the pressure in the coacting conduit tends to drive the vessel backward, thereby enabling the vessel to be revolved in a circle by reason of the additional thrust forces developed through the bent conduits.

In Fig. 9 I have shown an arrangement of bent conduits having portions which extend at obtuse angles with respect to each other as shown at 31 and 32. The bent conduits 31 and 32 are each connected with the pumping machinery 2 and 3, respectively, and serve to deliver maneuvering forces at the bow and stern of the vessel.

In Fig. 10 I have shown a composite assembly of bent conduits for obtaining the advantageous results of the conduits illustrated in the arrangements of Figs. 8 and 9. In Fig. 10 the pumping machinery 2 and 3 is provided with manifolds 35 and 36 and 37 and 38 which connect with bent conduits 31 and 27 and 28 and 32, respectively. These bent conduits are each provided with independently actuated control valves indicated at 31a and 31b and 27a and 27b and 28a and 28b and 32a and 32b as shown. Thrust forces may thus be obtained by this arrangement of bent conduits and developed in a plurality of directions giving resultant forces tending to drive the vessel forward or backward or in a curved path and facilitating maneuverability of the vessel with a high degree of precision.

Fig. 11 shows an arrangement of diagonally disposed conduits 39 and 40 extending from the pumping machinery indicated at 2 and 3. Conduits 39 and 40 extend from the pumping machinery 2 and 3, respectively, through the hull 1 to ports in the sides of the hull closely adjacent the amidship section. Thrust forces may be developed at opposite sides of the hull at the same time that the vessel is not impaired by the pumping machinery located adjacent the bow and stern of the vessel.

In Fig. 12 I have shown a method of combining transversely disposed conduits such as 15 and 16 of Figs. 5 and 6 with diagonally disposed conduits extending toward each other and toward the amidship section of the vessel. I have shown the diagonally disposed conduits at 41 and 42 connected with the pumping machinery at 2 and 3, respectively. The diagonally disposed conduits 41 and 42 are provided with control valves 41a and 41b and 42a and 42b, respectively. The transversely extending conduits 15 and 16 are provided as before with control valves 15a and 15b and 16a and 16b, respectively. The fact that controllable thrusts may be developed at positions along the exterior of the hull insures increased maneuverability of the vessel.

In Fig. 13 I have shown a method of obtaining additional flexibility in maneuverability of the vessel by continuing conduits 41 and 42 shown in Fig. 12 through the diametrically opposite sides of the casing of the pumping machinery and through the hull to the exterior of the vessel as indicated at 43 and 44, respectively. Valves 43a and 43b and 44a and 44b are arranged in the conduits 43 and 44 to enable these conduits to be made selectively effective or ineffective as required in developing the thrust forces in the desired position about the hull. It will be understood that the conduits are rendered selectively effective and may not all be used simultaneously. By driving through selected pairs of conduits the vessel may be given a twisting motion for docking purposes that is exceedingly desirable. The unused conduits may be closed by the valves therein for obtaining still more effective action.

In Fig. 14 I have shown an arrangement of conduits in which the angularly bent conduits 41 and 42 connected with the pumping machinery 2 and 3 located in the stern and bow of the vessel provide for the establishment of thrust forces fore and aft of the vessel while a combination of conduits located amidships provide for the development of forces adjacent the amidship section of the vessel. Pumps 25 and 26 located adjacent the amidship section of the vessel are serially connected in transverse conduits 45 and 46, respectively. Valves 45a and 45b are arranged to control the operation of transverse conduit 45 and valves 46a and 46b are arranged to control the operation of transverse conduit 46. Bent conduits 47 connect with pump 25 and terminate substantially at the amidship section of the vessel. Control valves 47a and 47b are arranged in conduit 47. Bent conduits 48 connect with pump 26 and extend to substantially the amidship section of the vessel with control valves 48a and 48b disposed in series therein. By selectively controlling the different valves, thrust forces are developed on the port and starboard side of the vessel which are readily controlled for precisely maneuvering the vessel.

In Fig. 15 I have shown an arrangement of diagonally disposed conduits 49 and 50 arranged in a vessel. The pump indicated at 2 is disposed in series with conduit 50 while the pump indicated at 3 is disposed in series with conduit 49. Conduit 49 passes beneath conduit 50. The forward end of the conduits terminate on opposite sides of the bow of the vessel while the aft ends of the conduits terminate aft of the amidship section of the vessel. The pumps force sea water through the conduits for developing forces in such positions as will serve to accurately maneuver the vessel. It will be observed that in Fig. 15, the pumping machinery 2 and 3 is individual to each of the conduits.

In Fig. 16 I have shown the manner in which a single pumping system 51 serves the two diagonally extending conduits 52 and 53. In this arrangement the thrust forces are developed more closely adjacent opposite sides of the bow than in the arrangement shown in Fig. 15 and thrust forces may be developed in positions more closely adjacent the stern of the vessel through the ends of conduits 52 and 53. Valves 52a and 52b are arranged in conduit 52. Valves 53a and 53b are arranged in conduit 53. By operation of these valves, the conduits may be rendered effective to move the vessel to the port or starboard or forward or backward.

In Fig. 17 I have shown a more complete method of control by which sets of independent conduits may simultaneously develop thrust forces fore and aft of the vessel. I have illustrated in addition to the pumping machinery 2 and 3 disposed in conduits 54 and 55, respectively, adjacent the forward portion of the vessel, the pumping machinery 56 and 57 arranged in conduits 58 and 59, respectively, adjacent the aft portion of the vessel. By reason of the independent forces which may be developed by the operation of the several pumps, considerable improvement in the navigability of the vessel is obtained.

In Fig. 18 I have shown an arrangement of conduits 54 and 55 and 58 and 59 similar to the arrangement shown in Fig. 17 except that pumping machinery 60 is provided in common for conduits 54 and 55, while pumping machinery 61 is provided in common for conduits 58 and 59. Valves 54a and 54b and 55a and 55b are arranged in conduits 54 and 55, respectively. Valves 58a and 58b and 59a and 59b are arranged in conduits 58 and 59, respectively. Thus it will be seen that a multiple number of conduits may be united and controlled by a single pump or the conduits may be arranged independently and each controlled through its own pump.

In Fig. 19 I have shown a manner of obtaining even greater flexibility of control by increasing the angular disposition of conduits 54 and 55 and conduits 58 and 59 with respect to pumping machinery 60 and 61 and then extending transversely disposed conduits 62 and 63 through the pumping machinery 60 and 61. Valves are arranged in conduits 54 and 55 and 58 and 59 as explained in connection with the arrangement shown in Fig. 18. In addition, the transverse conduits 62 and 63 have valves 62a, 62b, 63a and 63b arranged therein for controlling the effectiveness of the conduits. By reason of the termination of the several conduits in spaced positions around the hull, forces may be developed having such resultants as will effectively maneuver the vessel as required.

The angular disposition of the conduits is of very great importance because of the spacial relation of the terminating ends of the conduits in the sides of the hull. In Fig. 20 I have shown the manner in which thrust forces are developed adjacent the fore and aft portions of the vessel in closely spaced positions because of the fact that conduits 64 and 65 are arranged substantially at 30° to each other and conduits 66 and 67 correspondingly arranged at substantially 30° as distinguished from the 90° relationship of conduits 54 and 55 and conduits 58 and 59 in the arrangement shown in Fig. 18. It will be understood that the arrangement illustrated in Fig. 20 shows an acutely angled relationship of the conduits and is not restricted to the 30° relationship mentioned. Conduit 64 contains control valves 64a and 64b. Conduit 65 contains control valves 65a and 65b. Control valves 66a and 66b are disposed in conduit 66. Control valves 67a and 67b are arranged in conduit 67. By manipulation of selected control valves, the thrust forces may be selectively delivered to those parts of the vessel which will insure the proper maneuvering of the vessel.

In order to obtain distribution of the maneuvering forces in positions closer to the amidship section of the vessel and closer to the bow and stern, I may change the angular relationship of the conduits as illustrated in Fig. 21 wherein conduits 68 and 69 extend from the pumping machinery contained in casing 60 while conduits 70 and 71 extend from the pumping machinery contained within casing 61. Flow of water through conduit 68 is controlled by valves 68a and 68b while flow of water through conduit 69 is controlled by valves 69a and 69b. Similarly, flow of water through conduit 70 is controlled through valves 70a and 70b while flow of water through conduit 71 is controlled by valves 71a and 71b. Manipulation of selected valves enables thrust or suction forces to be made effective at substantially the amidship section of the vessel and in a position close to the bow and stern of the vessel.

In the arrangements shown in Figs. 18–21, I may employ rudimentary conduits leading from the pumping machinery and connected to branches leading to the several conduits illustrated in Figs. 18–21. The circle showing the pumping machinery may be regarded as illustrative of the location of the pumping machinery while the rudimentary conduits extend therefrom and connect to branches constituting the conduits that pass through the hull in the manner hereinafter described in connection with Fig. 26.

In Fig. 22 I have shown longitudinally extending curved conduits 72 and 73 within vessel 1 arranged to overcome head resistance at the bow and drag at the stern of the vessel for facilitating the maneuvering of the vessel within small areas. The reversible pumping machinery 74 is included in longitudinally extending conduit 72 while the separate reversible pumping machinery 75 is included in conduit 73. It will be seen that conduits 72 and 73 are both curved from positions adjacent the port and starboard sides of the hull to positions adjacent the bow and stern of the vessel. When the pumping machinery 74 and 75 operates in the same direction, water may be driven backward through the conduits 72 and 73, thereby reducing head resistance at the bow and neutralizing drag at the stern so as to drive the vessel forward. By operating the pumping machinery 74 and 75 selectively both as to speed or direction, twisting and maneuvering forces may be introduced which aid in the swinging of the vessel within a small area.

In Fig. 23 I have shown another method of distributing the longitudinally extending conduits with respect to the pumping machinery 74 and 75. In this arrangement conduits 76 and 77 are provided extending along substantially curved paths which are concave with respect to each other and terminating in positions in the hull somewhat removed from the bow and stern. The conduits in Fig. 23 may be used separately with their individual pump as a useful maneuvering system to draw the vessel forward and around toward one side or the other. By selectively controlling the speed and direction of operation of pumping machinery 74 and 75, a vessel may be warped to a dock within a small area. It will be observed that conduits 76 and 77 terminate in such positions adjacent the bow and stern that pressures may be developed at points somewhat removed from the bow and stern.

My invention also contemplates the combination of conduits illustrated in Fig. 24 in which the curved conduits 78 and 79 extend from the same pumping machinery shown at 80. Valves 78a and 78b are provided in conduit 78 while valves 79a and 79b are provided in conduit 79. By selectively controlling the valves, the pressure through one curved conduit may be utilized to the exclusion of pressure through the other conduit.

As illustrated in Fig. 25, I may concentrate the forces which may be developed directly at the bow or at the stern of the vessel. In the arrangement of Fig. 25, independent pumping installations are provided adjacent the bow and stern of the vessel as indicated at 81 and 82, respectively. Conduits of arcuate contour are turned upon themselves to form almost a complete circle with the pumping machinery located toward the amidship section of the vessel. I have shown conduit 83 adjacent the bow of the vessel extending from pumping machinery 81 with the opposite extremities of the conduit 83 terminating at the bow of the vessel adjacent each other at 83a and 83b. At the stern of the vessel, conduit 84 extends from pumping machinery 82 and is bent upon itself so that the ends 84a and 84b terminate at the stern on opposite sides of the center line immediately adjacent each other. This arrangement of bent conduits allows the pumping machinery to be placed at the most favorable location possible, remote from the path between the openings of the conduits; and at the same time, the twisting operation imparted to the vessel is effective at the most favorable points with respect to the hull of the vessel, that is, at the most extreme points in both the bow and stern. Outlets 83a and 83b or 84a and 84b may be arranged one above the other so that the respective conduits form a complete circle and more effective thrust forces are developed. Similar conduits may be provided at various positions in the hull of the vessel as desired.

In Fig. 26 I have shown the arrangement of a single pump indicated generally at 85 for controlling pressures through two or more conduits distributed through a vessel. Rudimentary conduits extend from opposite ends of the casing of the pumping machinery indicated at 85 as shown at 85a and 85b. Connection is made with the rudimentary conduits by a multiplicity of branch conduits indicated at 86 and 87. The branch conduits 86 include three conduits shown at 86a, 86b and 86c, respectively, containing control valves 86a', 86b' and 86c'. The branch conduits 87 include three conduits 87a, 87b and 87c, each of which are controlled by valves 87a', 87b' and 87c'. The pumping machinery 85 is representative of any class of reversible pump such as a reversible centrifugal pump, a reversible rotary pump, or a reversible centrifugatory or duplex pump.

The application of the principles of my invention to undersea craft or submarines has been illustrated in Figs. 27–31, wherein the hull of the submarine has been shown generally at 88, the views showing a vertical longitudinal section through the submarine.

In Fig. 27 I have shown an arrangement of curved conduits 89 and 90 which extend longitudinally of the submarine and terminate directly at the bow and stern of the submarine. The conduits in their longitudinally extending portions in the amidship section of the submarine contain series arranged reciprocatory pump systems 91 and 92, respectively. Forces are developed through the conduits 89 and 90 immediately at the bow of the submarine at the terminus of the conduits as indicated at 89a and 90a. Forces are developed at the stern of the submarine at the terminus of conduits 89 and 90 at 89b and 90b as indicated. The pressures developed facilitate submerged or surface navigation of the submarine.

In Fig. 28 I have shown the manner in which the curved conduit system of my invention may be used to facilitate diving and emerging operations of the submarine. Conduits 93 and 94 are arcuate shaped in contour and extend in opposite directions with respect to each other terminating at the bottom of the hull of the submarine and at the top of the hull of the submarine as shown. By this arrangement, pressures are developed below and above the submarine under control of the pumping machinery 91 and 92.

In Fig. 29 I have shown the manner in which the same pumping machinery 95 may be employed to develop pressures effectively beneath the bottom of the hull of the submarine or above the top of the hull of the submarine. In this arrangement, curved conduits 96 and 97 extend from the same pumping machinery 95 and terminate adjacent the top of the hull of the submarine and adjacent the bottom of the hull of the submarine as shown. Valves 96a and 96b are arranged in arcuate shaped conduit 96 while valves 97a and 97b are arranged in the arcuate shaped conduit 97.

I may employ diagonally arranged conduits extending longitudinally through the submarine as illustrated in Figs. 30 and 31. In Fig. 30, pumping machinery indicated at 98 is arranged amidships of the submarine and conduits 99 and 100 extend diagonally through the submarine. Provision may be made for laterally curving the conduits 99 and 100 out of the center line of the submarine and locating the pumping machinery 98 off the central axis of the submarine to avoid interference with normal operations of the boat. The conduits 99 and 100 develop forces above and below the hull of the submarine, thereby facilitating submerging and emerging operations.

In Fig. 31 I have shown an arrangement of conduits individual to separate pumping installations wherein independent pumps are represented at 101 and 102. Pump 101 is located in series with diagonally extending conduit 103, while pump 102 is disposed in series with diagonally extending conduit 104. Separate controls to the pumps 101 and 102 enable pressures to be built up in either conduits 103 or 104 in the required directions. It will be understood that the pumps 101 and 102 are located off center of the submarine and that the conduits 103 and 104 are laterally bent to positions which will not interfere with the normal maneuvering of the vessel.

In all of the views which have been heretofore described, it will be understood that the conduits may be so shaped and directed that pumping machinery while located in the general position illustrated in the several views is actually out of the path of the center of the vessel so that the normal working space within the vessel is not interfered with and all of the normal equipment aboard such vessels may function in its regular and intended manner without interference from the added equipment contemplated by my invention.

In Figs. 32 and 33 I have shown one of the practical embodiments of my invention within vessel 1. In Fig. 32 I have illustrated in side elevation the manner in which the conduits 105 and 106 are bent upwardly from the pumping machinery 107 and 108 which is located in the lowermost position of the hull. The mass of the pumping machinery 107 and 108 is quite substantial but this mass is usefully employed in applicant's arrangement as stabilizing ballast for the vessel. The pumping machinery is disposed out of alignment with the terminating ends of the curved conduits 105 and 106 so that the center of gravity of the pumping machinery may be located at positions in the vessel which will increase the stability of the vessel for navigation.

In Fig. 35 I have shown in lateral cross section, one form of pumping machinery adapted for use in the system of my invention. The pumping machinery includes a preformed casing 109 with rotor 110 journaled eccentric to casing 109 as indicated generally by the mounting of driving shaft 111. The rotor 110 includes a multiplicity of radially disposed pockets 112 in which vanes 114 are slidably mounted. Vanes 114 are continuously urged outwardly in pockets 112 by confined springs 115 tending to thrust vanes 114 into continuous engagement with the central track 116 which throughout a portion of the opposite arcuate shaped walls of the casing 109 is contiguous with the walls of the casing. The driving shaft 111 is operated through bevel gear 117 as shown more particularly in Fig. 34 which may be driven clockwise or counterclockwise through either bevel gears 118 and 119. Bevel gears 118 and 119 are carried by sleeve 120 which is slidably keyed to shaft 121 journaled in bearings provided in uprights 124 and 125. Sleeve 120 carrying bevel gears 118 and 119 is engaged by a collar shown generally at 122 through which sleeve 120 may be shifted by operation of hand lever system 123 to permit engagement of either bevel gear 118 or 119 with bevel gear 117. The lever system 123 terminates at the control position of the vessel and may include a number of linkages and cables all of which are controlled from hand lever 123 in the control position of the vessel to effect shifting of bevel gears 118 or 119 selectively into engagement with bevel gear 117 to control the direction of movement of rotor 110. The prime mover for driving shaft 121 is shown generally in the form of an electric motor 126 supported on base structure 127 which also carries the gear box 128 through which the rotary movement is controlled as to speed and the driving force delivered through clutch system 129 to the shaft 121 and through sleeve 120 keyed thereto through bevel gears 118 or 119 engageable with bevel gear 117. The speed of motor 126 is controlled at the same position at which the direction of movement of the pump is controlled through lever system 123, as represented by the control box or rheostat 129. Thus it will be seen that the speed and direction of movement of the pumping machinery are controllable from the pilot's position on the vessel. The clutch 129 is provided so that in the event that obstruction should occur in the conduit 105 which might interfere with the movement of rotor 110, failure of the drive shaft may be eliminated by slipping of the clutch. The description thus far given applies to the forward drive in the bow of the vessel. The arrangement adjacent the stern of the vessel for the pumping machinery 108 is identical with the arrangement adjacent the bow of the vessel and for purposes of explaining my invention I have shown similar parts with similar reference characters which are in each instance primed to indicate the mechanism adjacent the stern of the vessel as distinguished from the mechanism adjacent the bow of the vessel. The control circuit for the electric motor 126' extends to the control rheostat 129' adjacent the reversing lever mechanism 123' through circuit designated at 130. The reversing lever mechanism operated by lever 123' through collar 122' to effect engagement of either bevel gears 118' or 119' with bevel gear 117' is operated through suitable link connection 131.

The variable speed controls 129 and 129' and the direction of operation controls 123 and 123' are all in a position in which the pilot may control the operation thereof while controlling all of the other multifarious functions of the vessel. In addition to the controls illustrated in Fig. 34 a further control may be provided at the pilot's position as represented in Fig. 38 in the form of a reverse switch 132 which controls the power circuit to a motor 133 located adjacent each of the junctions of the conduits with the hull of the vessel. In Figs. 36, 37 and 38 I have illustrated the mechanism controlled by motor 133. Figs. 36 and 37 are views looking from the interior of the hull outwardly toward the side plates of the hull of the vessel 1. The conduit 105 has a guide 134 interposed between the end of the conduit shown at 105 and the side plates of the hull 1. The guide 134 is adapted to receive slidable plate member 135 which is transversely slidable between the interior of the side plate 1 of the hull and the end of the conduit 105. The plate 135 is provided with a pair of oppositely disposed guide portions 136, one of which may be provided with rack teeth indicated at 137 adapted to be engaged by gear 138 which is operated by motor 133. The plate 135 when moved transversely between the end of conduit 105 and the port 139 in the side plate 1 of the vessel will close the conduit 105. A relatively tight seal is provided between guide 134 and plate 135 so that leakage of water into the hull is prevented. By closing port 139 by means of side plate 135, conduit 105 may be rendered ineffective and the vessel operated under normal conditions. Motor 133 is driven forward or backward within predetermined limits by closing the power circuit thereto through reverse switch 132 to close or open the ends of the conduits. Selected conduits may be provided with this type of control while other conduits remain permanently open or all conduits may be provided with the control mechanism of Figs. 36, 37 and 38.

The valves in the several conduits have been shown as manually and locally controlled devices for the purpose of simplification but, it will be understood that all of these valves may be electrically motorized and remotely controlled from the control position of the vessel. Such control motors are reversible in direction for opening or closing the valves selectively from a distance. It will be understood that with the conduits arranged as in Figs. 10 and 13 and Figs. 16–21, a diagonal thrust is obtained which is very useful, for example, in warping a large vessel into its berth alongside of a pier. With certain combinations shown in Figs. 3 and 6, forces may be developed that likewise aid in producing diagonal shifting of the vessel.

In the arrangement shown in Fig. 24 there is also produced diagonal motion which is effective in facilitating navigation of the vessel.

By skillful control of the speed and direction of the pumping machinery, a large vessel may be maneuvered with precision in entering or leaving a port, or the propulsion of a vessel facilitated in association with the normal propelling means. I have described my invention in certain of its preferred embodiments, but I realize that modifications of my invention may be made and I intend no limitations upon my invention other than may be imposed by the scope of the appended claims.

What I claim as new and desire to secure by Letters Patent of the United States is as follows:

1. Mechanism for maneuvering a vessel having a hull, comprising pumping machinery located adjacent opposite ends of the vessel, conduits substantially looped upon themselves, said conduits being individual to the pumping machinery in each end of said vessel, one of said conduits having its ends located adjacent each other and opening through the hull of the vessel substantially at the bow thereof and the other of said conduits having its opposite ends located adjacent each other and opening through the hull of the vessel substantially at the stern thereof, and means for controlling the speed and operation of said pumping machinery, the resultant of the fluid forces at either end of said vessel being in a direction substantially normal to the longitudinal axis of said vessel.

2. Mechanism for maneuvering a vessel having a hull, including reversible propulsion mechanism located in positions in the bow and stern sections of said vessel, individual conduit systems connected with the reversible propulsion mechanism at each position, each of said conduit systems including inlet and outlet conduits extending from the respective reversible propulsion mechanism to opposite sides of said vessel and opening through said hull in positions adjacent each other in the respective bow and stern sections of said vessel for operation in executing a determined maneuver with said vessel, and means for controlling the speed and direction of operation of the reversible propulsion mechanism at each position for aiding in the execution of the desired maneuver.

3. Mechanism for maneuvering a vessel having a hull, in a turning movement, independently of the main steering means of the vessel, comprising a conduit system having openings located at selected adjacent positions in said hull, and pumping machinery in said conduit system, said conduit system being disposed within said hull and extending between said openings in a continuously curved path constituted by a substantially U-shaped section and sections connected therewith and curved toward each other, the fluid moving through said conduit system during said turning movement being effective to stabilize the maneuvering of said vessel, and the forces of reaction at the adjacent openings of said conduit system due to the movement of fluid through said system being substantially in the line of movement of the openings in said hull.

4. Mechanism for maneuvering a vessel having a hull, in a turning movement, independently of the main steering means of the vessel, comprising a conduit having openings located at selected immediately adjacent positions in said hull, and pumping machinery in said conduit, said conduit being disposed within said hull between said openings and continuously curved symmetrically from the middle to the opposite ends of said conduit, the fluid moving through said conduit during said turning movement being effective to stabilize the maneuvering of said vessel, and the forces of reaction at the openings of said conduit due to the movement of fluid therethrough being substantially tangential to the curve of said conduit.

5. Mechanism for maneuvering a vessel having a hull, comprising conduits substantially looped upon themselves and having their respective ends located adjacent each other and opening through the hull of the vessel at selected positions, pumping machinery in said conduits, and means for controlling the speed and operation of said pumping machinery, the resultant of the fluid forces at the openings of the ends of each conduit being in a direction tangential to the arc of the respective looped conduit.

6. Mechanism for maneuvering a vessel having a hull, comprising a conduit substantially looped upon itself and having its ends located adjacent each other and opening through the hull of the vessel at selected positions, said conduit being substantially circular in form between said openings, and pumping machinery in said conduit, the fluid moving through said conduit under the action of said pumping machinery being effective to stabilize the maneuvering of said vessel, and the resultant of the fluid forces at the openings of said conduit being in a direction tangential to the arc of the substantially circular conduit.

7. Mechanism for maneuvering a vessel having a hull, comprising a conduit substantially looped upon itself and pumping machinery in said conduit, said conduit having its opposite intake and discharge ends located adjacent each other and opening through the hull of the vessel, and means for controlling the speed and operation of said pumping machinery, the resultant of the fluid forces at the opposite ends of said conduit being in a direction substantially tangential to the curve of said looped conduit.

8. Mechanism for maneuvering a vessel having a hull, in a turning movement, independently of the main steering means of the vessel, comprising a conduit having openings located at adjacent positions in said hull, and pumping machinery in said conduit, said conduit being disposed within said hull and extending from one of said openings to the other of said openings, said conduit redoubling upon itself in its passage from one of said openings to the other so that its ends are substantially contiguous at its points of exit, and means for controlling the speed and operation of said pumping machinery for drawing in the fluid at one of said openings and driving it out at the other.

9. Mechanism for maneuvering a vessel having a hull, in a turning movement, independently of the main steering means of the vessel, comprising a conduit disposed within said hull and having openings located at adjacent positions in said hull, and pumping machinery in said conduit, said conduit being looped and redoubled upon itself in its passage from one of said openings to the other, the ends of said conduit being substantially contiguous at their points of emergence, and means for controlling the speed and operation of said pumping machinery for aiding the maneuverability of the vessel.

10. Mechanism for maneuvering a vessel having a hull, in a turning movement, independently of the main steering means of the vessel, comprising a conduit disposed within said hull, said conduit having openings at adjacent positions in said hull and pumping machinery in said conduit, said conduit being looped and redoubled upon itself in its passage from one of said openings to the other, the opposite ends of said conduit gradually approaching each other as they approximate their points of emergence so that the suction and driving forces generated at their points of emergence are exerted at substantially the same position, and means for controlling the speed and operation of said pumping machinery.

HENRY C. BRIGGS.